Patented Dec. 18, 1951

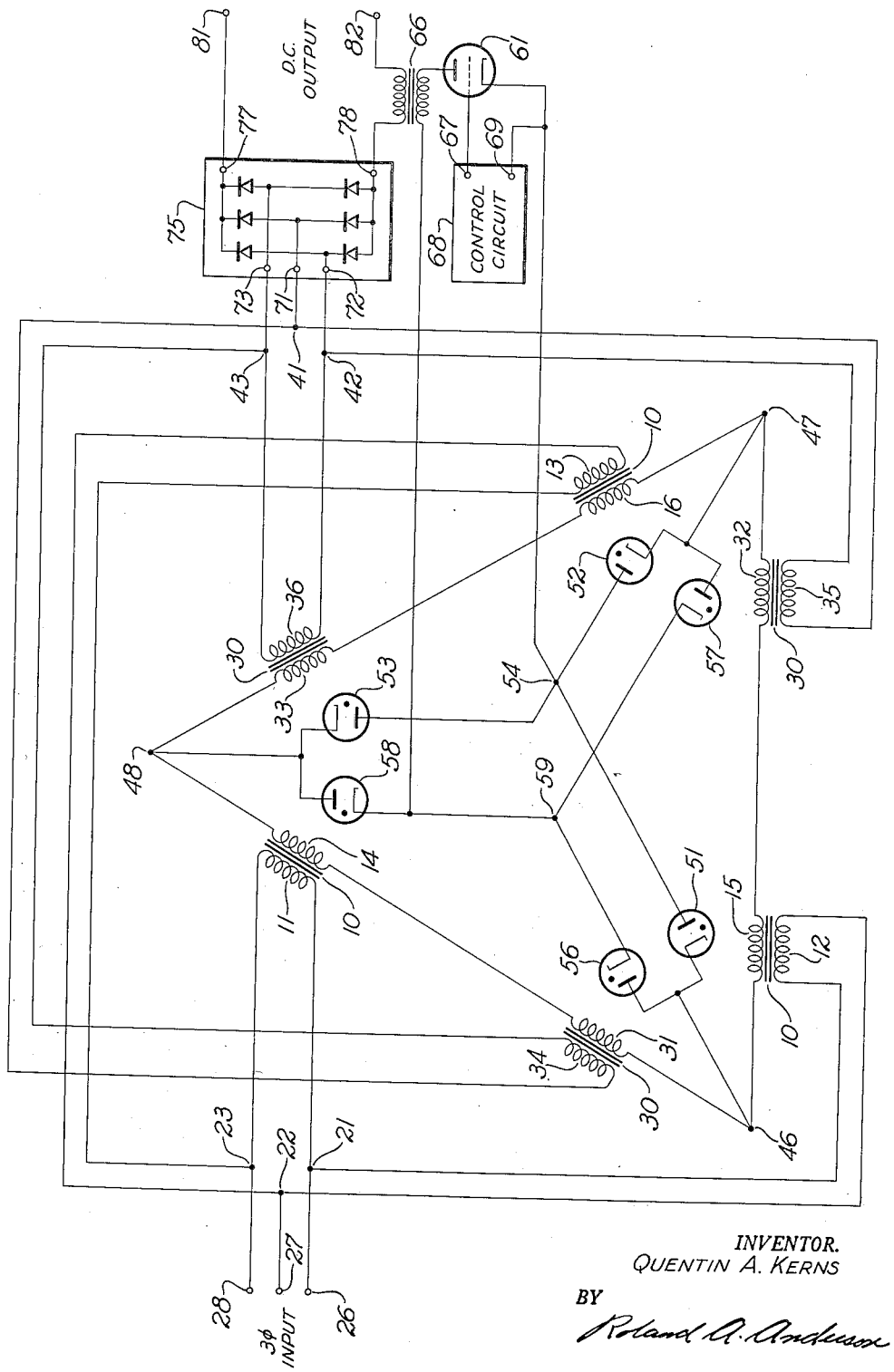

2,579,235

UNITED STATES PATENT OFFICE 2,579,235

RECTIFIER SYSTEM

Quentin A. Kerns, Berkeley, Calif., assignor to the United States of America as represented by the United States Atomic Energy Commission Application October 20, 1950, Serial No. 191,303

8 Claims. (Cl. 321—18)

The present invention relates to a rectifier system and more particularly to a three-phase high current rectifier system which may be electronically controlled.

Rectifier systems utilizing mercury vapor rectifiers do not readily lend themselves to control. Once an arc is struck in a mercury vapor type of rectifier the arc continues until the anode-to-cathode voltage drops below the conduction voltage. Such a characteristic means that control of voltage during the period of conduction is extremely difficult at best. Another difficulty is experienced in low voltage, high current, rectifier circuits because of the relatively large resistance of the rectifier during conduction which in some instances results in a voltage drop of the order of eight volts. Thus, if the desired voltage output is to be fifteen or sixteen volts, the eight volt drop of the rectifier is too appreciable to ignore.

In rectifier systems for polyphase circuits the foregoing problems are multiplied. Further, a separate control circuit is necessary for the starter of each rectifier, thereby making the system more complicated and difficult to maintain.

The foregoing difficulties are overcome in the present invention by providing two polyphase transformers interconnected so that the current flow in the secondary windings of one transformer is electronically controlled to determine the output of the second transformer.

It is therefore an object of the present invention to provide a new and improved rectifier system.

Another object of the invention is to provide a rectifier system which is readily controlled by electronic means.

A further object of the invention is to provide a low voltage-high current rectifier system which is easily controlled and regulated by a negative feedback connection.

Still another object of the invention is to provide electronic control of current flowing through the secondary windings of a polyphase transformer to determine the output voltage of a second polyphase transformer and thereby the voltage to a polyphase rectifier.

Further objects and advantages of the invention will be apparent in the following description and claims considered together with the accompanying drawing which is a schematic wiring diagram of the invention.

Referring to the drawing in detail a first three-phase transformer 10 of conventional design having three primary windings 11, 12, and 13 and three secondary windings 14, 15, and 16 mounted upon a single core (illustrated as three separate cores and located with the respective windings on the drawing) is utilized at the input of the circuit. In the present embodiment of the invention the primary windings 11, 12, and 13 of the transformer 10 are connected in the form of a delta so that there is a junction 21 between the first and second primary windings 11 and 12, a junction 22 between the second and third primary windings 12 and 13, and a junction 23 between the third and first primary windings 13 and 11. Each of the junctions 21, 22, and 23 of the primary windings of the transformer 10 is connected to one of three terminals 26, 27, and 28. To excite the primary windings 11, 12, and 13 of the transformer 10 the terminals 26, 27, and 28 are respectively connected to a source of three-phase power which may be either commercially available or locally generated.

A second three-phase transformer 30 of conventional design having three primary windings 31, 32, and 33 and three secondary windings 34, 35, and 36 mounted upon a single core (illustrated as three separate cores and located with the respective windings on the drawing) is utilized at the output of the circuit. The secondary windings 34, 35, and 36 of the transformer 30 are connected in the form of a delta so that there is a junction 41 between the first and second secondary windings 34 and 35, a junction 42 between the second and third secondary windings 35 and 36, and a junction 43 between the third and first secondary windings 36 and 34. The further connections of the junctions 41, 42, and 43 will be set forth hereinafter.

To couple the output of the transformer 10 to the input of the transformer 30 each of the secondary windings 14, 15, and 16 of the former is connected in series with one of the primary windings 31, 32, and 33 of the latter. Thus, three series circuits are formed, the first comprising the secondary winding 14 and the primary winding 31, the second comprising the secondary winding 15 and the primary winding 32, and the third comprising the secondary winding 16 and the primary winding 33. These three series circuits are then connected in the form of a delta so that there is a junction 46 between the windings 31 and 15, a junction 47 between the windings 32 and 16, and a junction 48 between the windings 33 and 14.

A first set of three mercury vapor rectifier tubes 51, 52, and 53 having the anodes thereof connected at a junction 54 is provided with the cathode of the tube 51 connected to the junction 46, the cathode of the tube 52 connected to the junction 47, and the cathode of the tube 53 connected to the junction 48. A second set of three mercury vapor rectifier tubes 56, 57 and 58 having the cathodes thereof connected at a junction 59 is provided with the anode of the tube 56 connected to the junction 46, the anode of the tube 57 connected to the junction 47, and the anode of the tube 58 connected to the junction 48. To provide a simple variable conductance path between the junctions 54 and 59, a high-vacuum triode control tube 61 is connected therebetween by connecting the anode to the junction 59 through the primary winding of a transformer 66 and the cathode directly to the junction 54. The control grid of the tube 61 is then connected to an output terminal 67 of a control circuit 68. The other output terminal 69 is connected to the cathode of the tube 61 so that the output voltage of the control circuit 68 is impressed between the control grid and cathode of the tube 61. The control circuit 68 may be a source of unidirectional voltage with a potentiometer across the output for manually controlling the output voltage or an electronic circuit for developing an output control voltage having any desired waveform.

The junctions 41, 42, and 43 are connected to input terminals 71, 72, and 73 of a conventional three-phase rectifier unit 75. As shown in the drawing the rectifier unit 75 may comprise three parallel circuits of two series connected rectifiers such as selenium or copper oxide with the input terminals connected to the midpoints thereof. The two common connections of the parallel circuits are then connected to two output terminals 77 and 78 of the rectifier unit 75. The terminal 77 is connected to a terminal 81 which serves as one side of the unidirectional output voltage while the terminal 78 is connected through the secondary winding of the transformer 66 to a terminal 82 which serves as the other side of unidirectional output voltage.

With the input terminals 26, 27, and 28 connected to a suitable source of three-phase power it will be apparent that the voltage of one of the phases appears across each of the primary windings of the transformer 10. The secondary windings of the transformer 10 then reflect the primary voltages, but differ therefrom by the ratio-of-transformation factor of the transformer. The primary windings of the transformer 10 may be Y-connected which will lower the voltage of the primary windings and thereby the voltage of the secondary windings. Considering only the connections of the transformers 10 and 30 it will be seen that no current will flow in the secondary circuit of the transformer 10 and therefore that there will be no flow of current through the primary windings of the transformer 30. Under such condition the unidirectional voltage at the output terminals 81 and 82 is zero.

Now consider the circuit as fully described in the foregoing. Under this condition a series path may be traced from the secondary winding 14 of the transformer 10 to the primary winding 31 of the transformer 30, through the tube 56 to the secondary winding of the transformer 66, through the tube 61 to the junction 54, and from there through the tube 53 back to the winding 14 of the transformer 10. Also, a reverse series path may be traced utilizing the tubes 58 and 51. Because of the series paths just described current will flow in the secondary winding 14 of the transformer 10 in response to the impressed primary voltage; that is, during that portion of the cycle of the impressed voltage, wherein the junction 46 becomes more positive than the junction 48, the rectifier tubes 56 and 53 are conductive, and assuming that the control tube 61 is conductive, a load circuit is completed so that current flows. Similarly, during that portion of the cycle of the impressed voltage, wherein the junction 48 becomes more positive than the junction 46, the rectifier tubes 58 and 51 are conductive, and again assuming that the control tube 61 is conductive, a load circuit is completed so that current flows. When current flows through the primary winding 31 of the transformer 30 a voltage is induced in the secondary winding according to the ratio-of-transformation of the transformer.

The operation of the circuit as set forth in the preceding paragraph for one phase is also applicable for the other two phases of the three-phase system. Thus, a three-phase voltage source is formed at the three junctions 41, 42, and 43 of the secondary windings of the transformer 30. Since the junctions 41, 42, and 43 are connected to the input terminals 71, 72, and 73 of a three-phase rectifier 75, a unidirectional voltage appears at the terminals 81 and 82.

It has been found that contact rectifiers, such as copper oxide and selenium, possess a relatively high inherent electrostatic capacity. From the drawing it is apparent that the three sets of rectifiers in the unit 75 are connected in parallel between the output terminals 77 and 78 and are thereby in parallel with any load which is connected between the terminals 81 and 82. Considering the relation wherein current equals capacity times the rate of change of voltage with respect to time, it is apparent that a high value of reactive current would be necessary to produce a voltage having high-frequency components of appreciable amplitude across the terminals 77 and 78. The transformer 66, however, provides a direct path from the tube 61 to the terminals 78 and 82 for the high-frequency components of the voltage at the output terminals 81 and 82. Lower frequency components as well as the average direct current level of the wave appear across the terminals 77 and 78. The primary winding of the transformer 66 is connected in series with the anode of the tube 61 and the secondary winding is connected between the terminals 78 and 82. The turns ratio of the transformer 66 may be set equal to the ratio of the unidirectional output current to the anode current of the tube 61, the latter ratio being substantially constant. In this manner the magnetic saturation of the ferromagnetic core of the transformer 66 by the unidirectional current may be avoided, since the primary and secondary ampere turn products are equal and opposite.

Control of the system is easily accomplished by suitably biasing the control grid of the tube 61 with a control circuit 68. For applications which do not require less than the normal percentage of three-phase full-wave ripple in the unidirectional output voltage, the control circuit 68 may be a source of voltage adjustable from a value at which the tube 61 is cut off to a value at which the tube 61 conducts with maximum current therethrough. Under such condition the unidirectional voltage output may be varied from zero to a maximum value as desired.

For applications, whereby an output voltage which varies in accordance with a control signal voltage is desired, the control circuit 68 may comprise means for comparing the signal voltage with the actual output voltage so that any small differences therebetween control the bias for the tube 61. Under such condition the rectifier system acts as a controllable unidirectional voltage generator of low internal impedance.

Also, for applications whereby an output current which varies in accordance with a control signal voltage is desired, the control circuit 68 may comprise means for comparing the signal voltage with a voltage proportional to the load current so that any small differences therebetween control the bias for the tube 61. Under such condition the rectifier system acts as a controllable unidirectional current generator of high internal impedance.

It will be apparent from the foregoing considerations that, by connecting two rectifier systems in series, a controllable bidirectional, voltage or current, source may be obtained. It is also to be noted that the principles of the invention, as outlined above, may readily be utilized with other types of polyphase sources of power to develop electronically controllable unidirectional voltage. Also, the connections of the transformers 10 and 30 may be in the form of a Y without departing from the scope of the invention.

It has been found that by connecting a 1500 volt-ampere three-phase transformer, having a 230 volt delta-connected primary and a 2800 volt six wire secondary, to a 1500 volt-ampere three-phase transformer, having a 2800 volt six wire primary and a 16 volt delta-connected secondary, in the manner described above, a maximum unidirectional output of about 30 volts at 50 amperes is obtained. By varying the bias of the control grid of the tube 61 the unidirectional output may be varied from zero to the maximum value with a time constant of less than $2 \times 10^{-6}$ seconds.

While the salient features of this invention have been described in detail with respect to one embodiment it will, of course, be apparent that numerous modifications may be made within the spirit and scope of the invention it is therefore not desired to limit the invention to the exact details shown except insofar as they may be defined in the following claims.

What is claimed is:

1. In a rectifier system having a first and second three-phase transformer with primary and secondary windings, the secondary windings of said first transformer being interconnected with the primary windings of said second transformer so that any current flow in the former flows through the latter, the combination comprising means connected to the primary windings of said first transformer for impressing a three-phase voltage, means connected to said interconnected transformer windings to provide current paths through a variable impedance in response to the instantaneous polarities of said three-phase voltage, means connected to said variable impedance for controlling the flow of current therethrough, and rectifier means connected to the secondary windings of said second transformer for developing a unidirectional output voltage.

2. In a rectifier system having a first and second three-phase transformer with primary and secondary windings, the secondary windings of said first transformer being interconnected with the primary windings of said second transformer so that any current flow in the former flows through the latter, the combination comprising means connected to the primary windings of said first transformer for impressing a three-phase voltage, a plurality of interconnected rectifier devices connected to said interconnected transformer windings to provide two current paths for each phase of voltage in response to the instantaneous polarities of said three-phase voltage, a variable conductance device connected between said paths, means connected to said variable device to control the flow of current therethrough, and rectifier means connected to the secondary windings of said second transformer for developing a unidirectional output voltage.

3. In a rectifier system having a first and second three-phase transformer with primary and secondary windings, the secondary windings of said first transformer being interconnected with the primary windings of said second transformer so that any current flow in the former flows through the latter, the combination comprising means connected to the primary windings of said first transformer for impressing a three-phase voltage, a plurality of interconnected rectifier devices connected to said interconnected transformer windings to provide two current paths for each phase of voltage in response to the instantaneous polarities of said three-phase voltage, a control tube having at least an anode, a control grid, and a cathode, said anode being connected to one of said current paths and said cathode being connected to the other of said paths, means connected to said control grid to control the conductance of said tube, rectifier means connected to the secondary windings of said second transformer for developing a unidirectional output voltage, and means for negatively coupling variations in said unidirectional voltage to the anode of said control tube.

4. In a method of rectifying three-phase power, the steps comprising transforming low-voltage three-phase power into high-voltage three-phase power, electronically controlling the currents of said three-phases of transformed power, producing three-phase voltages proportional to said controlled currents, transforming said proportional three-phase voltages into low-voltage, high current, three-phase voltages, and rectifying said last transformed three-phase voltages.

5. In a rectifier system, the combination comprising a first three-phase transformer having three primary and three secondary windings, a second three-phase transformer having three primary and three secondary windings, the secondary windings of said first transformer being alternately connected between the primary windings of said second transformer in a closed circuit, a variable impedance, one side of said impedance being connected to the negative terminals of three rectifiers the positive terminals of which are respectively connected to alternate junctions between the secondary windings of said first transformer and the primary windings of said second transformer, the other side of said impedance being connected to the positive terminals of three rectifiers the negative terminals of which are respectively connected to said alternate junctions, means also connected to said variable impedance to control current flow therethrough, rectifier means connected to the secondary windings of said second transformer to provide a unidirectional output voltage, and a source of three-phase power connected to the primary windings of said first transformer.

6. In a rectifier system, the combination comprising a first three-phase transformer having three primary and three secondary windings, a second three-phase transformer having three primary and three secondary windings, the secondary windings of said first transformer being alternately connected between the primary windings of said second transformer in a closed circuit, a variable impedance, one side of said impedance being connected to the cathodes of three diode rectifier tubes the anodes of which are respectively connected to alternate junctions between the secondary windings of said first transformer and the primary windings of said second transformer, the other side of said impedance being connected to the anodes of three diode rectifier tubes the cathodes of which are respectively connected to said alternate junctions, means also connected to said variable impedance to control current flow therethrough, rectifier means connected to the secondary windings of said second transformer to provide a unidirectional output voltage, means connected to said rectifier means for negatively coupling ripple voltages of said output voltage to one side of said variable impedance, and a source of three-phase power connected to the primary windings of said first transformer.

7. In a rectifier system, the combination comprising a first three-phase transformer having three primary and three secondary windings, a second three-phase transformer having three primary and three secondary windings, the secondary windings of said first transformer being alternately connected between the primary windings of said second transformer in a closed circuit, a control tube having at least an anode, a control grid, and a cathode, the anode of said control tube being connected to the cathodes of three diode rectifiers the anodes of which are respectively connected to alternate junctions between the secondary windings of said first transformer and the primary windings of said second transformer, the cathode of said control tube being connected to the anodes of three diode rectifiers the cathodes of which are respectively connected to said alternate junctions, a control circuit connected to the control grid of said control tube for supplying a bias thereto, a three-phase rectifier connected to the secondary windings of said second transformer, and a source of three-phase power connected to the primary windings of said first transformer.

8. In a rectifier system, the combination comprising a first three-phase transformer having three delta-connected primary windings and three secondary windings, a source of three-phase power connected to the primary windings of said first transformer, a second three-phase transformer having three primary windings and three delta-connected secondary windings, the secondary windings of said first transformer being alternately connected between the primary windings of said second transformer in a closed circuit, a control tube having at least an anode, a control grid, and a cathode, the anode of said control tube being connected to the cathodes of three diode rectifier tubes the anodes of which are respectively connected to alternate junctions between the secondary windings of said first transformer and the primary windings of said second transformer, the cathode of said control tube being connected to the anodes of three diode rectifier tubes the cathodes of which are respectively connected to said alternate junctions, a control circuit connected to the control grid of said control tube for supplying a bias thereto, a three-phase rectifier connected to the secondary windings of said second transformer, and a feedback transformer having one winding in series with the output of three-phase rectifier and another winding in series with the anode of said control tube.

QUENTIN A. KERNS.

REFERENCES CITED

The following references are of record in the file of this patent:

UNITED STATES PATENTS

| Number | Name | Date |
|---|---|---|
| 2,010,600 | Levy | Aug. 6, 1935 |
| 2,021,216 | Young | Nov. 19, 1935 |
| 2,099,715 | Young | Nov. 23, 1937 |
| 2,236,254 | Willis | Mar. 25, 1941 |